United States Patent
Yang et al.

(10) Patent No.: US 12,411,224 B1
(45) Date of Patent: Sep. 9, 2025

(54) SIDE LOBE BLOCKING APPARATUS AND METHOD

(71) Applicant: AGENCY FOR DEFENSE DEVELOPMENT, Daejeon (KR)

(72) Inventors: Eunjung Yang, Daejeon (KR); Youn Hui Jang, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 19/052,884

(22) Filed: Feb. 13, 2025

(30) Foreign Application Priority Data

Jun. 4, 2024 (KR) .................. 10-2024-0073309

(51) Int. Cl.
G01S 13/44 (2006.01)
G01S 7/292 (2006.01)

(52) U.S. Cl.
CPC ........ G01S 13/4418 (2013.01); G01S 7/2922 (2013.01)

(58) Field of Classification Search
CPC ..................... G01S 13/4418; G01S 7/2922
See application file for complete search history.

(56) References Cited

U.S. PATENT DOCUMENTS

| | | | |
|---|---|---|---|
| 5,400,035 A | 3/1995 | Liu | |
| 10,495,730 B1 * | 12/2019 | Bench | G01S 7/2813 |
| 11,402,488 B2 | 8/2022 | Kintz | |
| 11,838,151 B1 * | 12/2023 | Jones | H04L 25/0224 |
| 2020/0292691 A1 * | 9/2020 | Kintz | G01S 13/4445 |

FOREIGN PATENT DOCUMENTS

| | | |
|---|---|---|
| JP | 2014-514550 A | 6/2014 |
| KR | 10-2017-0021149 A | 2/2017 |
| KR | 10-2019-0087228 A | 7/2019 |
| KR | 10-2088913 B | 4/2020 |
| KR | 10-2188034 B | 12/2020 |
| KR | 10-2509098 B | 3/2023 |
| KR | 102509098 B1 * | 3/2023 |

OTHER PUBLICATIONS

Notice of Allowance in Korean Application No. 10-2024-0073309 dated Dec. 31, 2024.
Office Action in Korean Application No. 10-2024-0073309 dated Aug. 12, 2024.

* cited by examiner

*Primary Examiner* — Timothy X Pham
(74) *Attorney, Agent, or Firm* — Dilworth & Barrese, LLP.; Michael J. Musella, Esq.

(57) ABSTRACT

A side lobe blocking method for blocking side lobe signals in a side lobe blocking apparatus may be provided. The side lobe blocking method includes setting a sum channel and a plurality of different difference channels using a plurality of receiving beams and a main beam in which a target exists among the plurality of receiving beams; calculating a plurality of different monopulse ratios using ratios between each of the plurality of different difference channels and the sum channel; determining whether a main beam target is received in a main lobe based on each of the plurality of different monopulse ratios; and finally detecting whether the main beam target is received in the main lobe based on results determined based on each of the plurality of different monopulse ratios.

17 Claims, 14 Drawing Sheets

SIDE LOBE BLOCKING APPARATUS AND METHOD

CROSS-REFERENCE TO RELATED APPLICATION

This application claims priority to and the benefit of Korean Patent Application No. 10-2024-0073309 filed at the Korean Intellectual Property Office on Jun. 4, 2024, the entire contents of which are incorporated herein by reference.

BACKGROUND (a) Field

This disclosure relates to a side lobe blocking apparatus and method.

(b) Description of the Related Art

In radar, a side lobe blocking apparatus is used to remove signals received through side lobe of receiving beams of the antennas. The side lobe blocking apparatus detects signals received through the main lobe of the receiving beams among the signals selected as targets and excludes signals received by the side lobe from signals selected as targets.

In a typical radar, the side lobe blocking apparatus may include a main antenna, an auxiliary antenna, and receiver corresponding to each of the main antenna and the auxiliary antenna. Ideally, the main antenna has a pattern in which the gain of the main antenna is greater than the gain of the auxiliary antenna in the main lobe, and the gain of the main antenna is less than the gain of the auxiliary antenna in the side lobe. Using these features, the magnitude of signal of each channel of the main and auxiliary antennas are compared, and if the signal magnitude of the auxiliary antenna is larger than the signal magnitude of the main antenna, the input signal of the corresponding channel may be determined to be a side lobe signal and the input signal may be blocked.

Recently, instead of having a separate physical antenna such as the auxiliary antenna, a main channel is formed using all antenna elements of the main antenna, and an auxiliary channel that acts as the auxiliary antenna is formed using some elements of the main antenna for the purpose of side lobe blocking. For this, a linkage and communication channel for the auxiliary channel separate from the receiving beam channel of the main channel may be required. Additionally, hardware and communication channels must be designed in advance to be close to the ideal patterns of the main and auxiliary antennas, and it is not easy to change them later.

Therefore, a method for blocking side lobe signals without additional auxiliary channels is required.

Meanwhile, the monopulse may be used to estimate the exact target angle within the beam width of the main lobe, and a sum channel and a difference channel may be formed respectively, and the target angle may be estimated from the monopulse ratio, which is the ratio of a signal of the sum channel and a signal of the difference channel. In order to estimate the accurate angle from the monopulse ratio, it is assumed that the target is located in the main lobe of the antenna pattern, so it is important to remove the signals from the side lobe for accurate angle estimation.

SUMMARY OF THE INVENTION

At least one of the embodiments may provide a side lobe blocking apparatus and method capable of blocking side lobe signals using monopulse ratios without an additional auxiliary channel.

According to one embodiment, a side lobe blocking method for blocking side lobe signals in a side lobe blocking apparatus may be provided. The side lobe blocking method includes setting a sum channel and a plurality of different difference channels using a plurality of receiving beams and a main beam in which a target exists among the plurality of receiving beams; calculating a plurality of different monopulse ratios using ratios between each of the plurality of different difference channels and the sum channel; determining whether a main beam target is received in a main lobe based on each of the plurality of different monopulse ratios; and finally detecting whether the main beam target is received in the main lobe based on results determined based on each of the plurality of different monopulse ratios.

The finally detecting may include finally determining that the main beam target is received in the main lobe when it is determined that the main beam target is received in the main lobe based on monopulse ratios greater than or equal to a threshold number among the plurality of different monopulse ratios.

The finally determining may include setting the threshold number based on the signal-to-noise ratio of the main beam target.

The setting a sum channel and a plurality of different difference channels may include: setting the main beam as the sum channel; and setting each of the plurality of different difference channels using at least one beam among the plurality of receiving beams.

The determining may include: determining an upper threshold and a lower threshold of each of the plurality of different monopulse ratios; and determining whether the main beam target is received in the main lobe from each of the plurality of different monopulse ratios based on the upper threshold and the lower threshold of each of the plurality of different monopulse ratios.

The determining the upper and lower thresholds may include setting the upper and lower threshold based on an angular range of the main lobe of the main beam for each of the plurality of different monopulse ratios.

The determining the upper and lower thresholds may further include additionally applying a margin to the upper and lower thresholds based on a signal-to-noise ratio of the main beam target.

The calculating a plurality of different monopulse ratios may include determining the number of monopulse ratios based on a signal-to-noise ratio of the main beam target.

According to another embodiment, a side lobe blocking apparatus of a radar may be provided. The side lobe blocking apparatus includes: a monopulse ratio calculator configured to set a sum channel and a plurality of different difference channels using a plurality of receiving beams and a main beam in which a target exists among the plurality of receiving beams, and calculate a plurality of different monopulse ratios using ratios between each of the plurality of different difference channels and the sum channel; a candidate main lobe determiner configured to determine whether a main beam target is received in a main lobe based on each of the plurality of different monopulse ratios; and a main lobe detector configured to finally detect whether the main beam target is received in the main lobe based on results determined based on each of the plurality of different monopulse ratios.

The main lobe detector may be configured to finally detect that the main beam target is received in the main lobe when it is determined that the main beam target is received in the main lobe based on monopulse ratios greater than or equal to a threshold number among the plurality of different monopulse ratios.

The main lobe detector may be configured to set the threshold number based on a signal-to-noise ratio of the main beam target.

The monopulse ratio calculator may be configured to set the main beam as the sum channel and may be configured to set each of the plurality of different difference channels using at least one beam among the plurality of receiving beams.

The monopulse ratio calculator may be configured to: select one receiving beam from the remaining receiving beams excluding the main beam among the plurality of receiving beams; set one of the plurality of different difference channels using the selected one receiving beam; and set at least one of the plurality of different difference channels using the sum or difference of at least two receiving beams among the plurality of receiving beams.

The monopulse ratio calculator may be configured to determine the number of monopulse ratios based on a signal-to-noise ratio of the main beam target.

The candidate main lobe determiner may be configured to determine an upper threshold and a lower threshold of each of the plurality of different monopulse ratios, and may be configured to determine whether the main beam target is received in the main lobe from each of the plurality of different monopulse ratios based on the upper threshold and the lower threshold of each of the plurality of different monopulse ratios.

The candidate main lobe determiner may be configured to set the upper and lower thresholds includes setting the upper and lower threshold based on an angular range of the main lobe of the main beam for each of the plurality of different monopulse ratio.

The candidate main lobe determiner may be configured to additionally apply a margin to the upper and lower thresholds based on a signal-to-noise ratio of the main beam target.

DETAILED DESCRIPTION OF THE EMBODIMENTS

Figure 1:
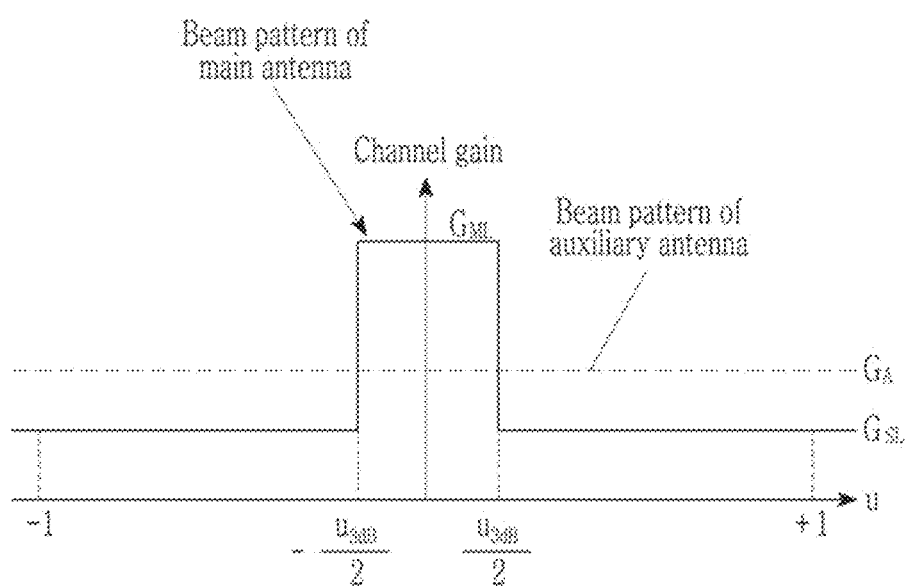
FIG. 1 is a diagram showing an example of the beam patterns of an ideal main antenna and an auxiliary antenna for blocking signal of a side lobe.

Hereinafter, embodiments of the disclosure will be described in detail with reference to the attached drawings so that a person of ordinary skill in the art may easily implement the disclosure. As those skilled in the art would realize, the described embodiments may be modified in various different ways, all without departing from the spirit or scope of the disclosure. The drawings and description are to be regarded as illustrative in nature and not restrictive. Like reference numerals designate like elements throughout the specification.

Furthermore, if a component is referred to be "connected" with another component, it includes not only the case where two components are "directly connected" but also the case where two components are "indirectly or non-contactedly connected" with another component interposed therebetween, or the case where two components are "electrically connected."

Additionally, Throughout the specification and claims, if a part is referred to "include" a certain element, it may mean that it may further include other elements rather than exclude other elements, unless specifically indicated otherwise.

In addition, in the flowcharts described with reference to the drawings in this specification, the order of operations may be changed, several operations may be merged, some operations may be divided, and specific operations may not be performed.

Now, a side lobe blocking apparatus and method according to an embodiment will be described in detail with reference to the drawings.

FIG. 1 is a diagram showing an example of the beam patterns of an ideal main antenna and an auxiliary antenna for blocking signal of a side lobe.

Referring to FIG. 1, the beams of the antenna may be divided into a main lobe and side lobes.

The main lobe of a main antenna may have a pattern in which a channel gain $G_{ML}$ of the main antenna is greater than a channel gain $G_A$ of an auxiliary antenna, and the side lobe of the main antenna may have a pattern in which the channel gain $G_{SL}$ of the main antenna is less than the channel gain $G_A$ of the auxiliary antenna. In FIG. 1, u may represent sinθ and θ may represent an angle.

A conventional side lobe blocking apparatus determines an input signal as a side lobe signal if a signal magnitude of the auxiliary antenna is larger than a signal magnitude of the main antenna, using the beam patterns of the main and auxiliary antennas.

A side lobe blocking apparatus according to an embodiment may provide a method for blocking side lobe signals by determining whether a main beam signal (hereinafter referred to as "main beam target") detected as a target has been received in a main lobe by using monopulse ratios without having separate physical antennas such as a main antenna and an auxiliary antenna. The monopulse ratio may represents a signal magnitude ratio between the sum channel and the difference channel, and may be calculated from the signal magnitude of the sum channel and the signal magnitude the difference channel.

Figure 2:
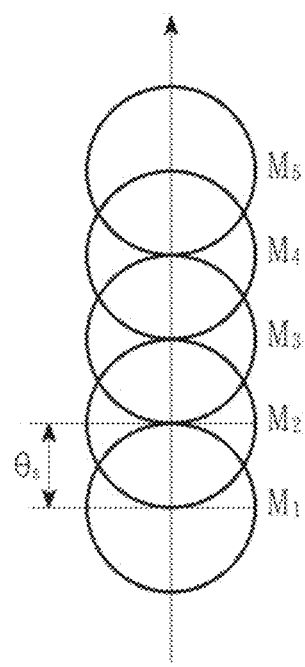
FIG. 2 is a diagram showing receiving beams of a radar according to an embodiment.

FIG. 2 is a diagram showing receiving beams of a radar according to an embodiment.

Referring to FIG. 2, the radar may include an array antenna.

The array antenna may form a plurality of receiving beams M1, M2, M3, M4, and M5. The spacing between adjacent receiving beams may be set to $\theta_s$. In FIG. 2, five receiving beams M1, M2, M3, M4, and M5 are illustrated for convenience, but the number of receiving beams is not limited thereto.

According to an embodiment, a sum channel and a difference channel may be set up using the plurality of receiving beams M1, M2, M3, M4, and M5. For example, if the main beam is the receiving beam M3, the sum channel may be set to the receiving beam M3 which is the main beam, and the difference channels may be set to combinations of at least one receiving beam among the plurality of receiving beams M1, M2, M3, M4, and M5. The side lobe blocking apparatus may detect only the signals received by the main lobe among the signals detected in the receiving beam M3 based on the monopulse ratios calculated from the signal magnitude ratio of the sum channel and the difference channel set in this way.

Figure 3:
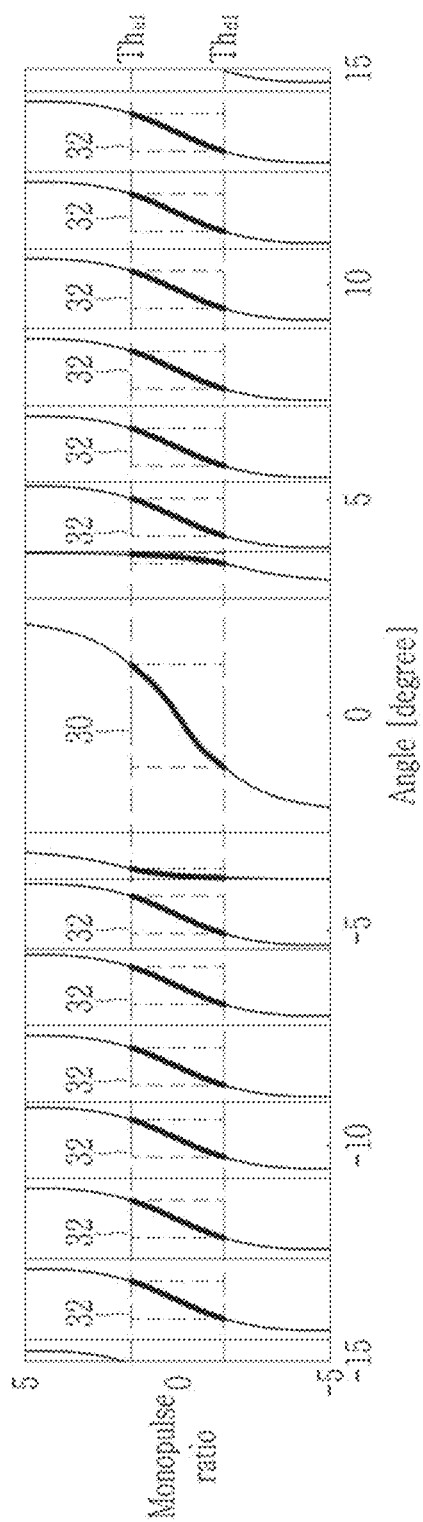
FIG. 3 is a diagram explaining a method for determining whether a main beam target has been received in a main lobe using a monopulse ratio according to an embodiment.

FIG. 3 is a diagram explaining a method for determining whether a main beam target has been received in a main lobe using a monopulse ratio according to an embodiment.

The monopulse ratio $R_1$ may have values of the form shown in FIG. 3 depending on reception angles of the signal. At this time, the monopulse ratio $R_1$ may be calculated as in equation 1. The sum channel $\Sigma_1$ may be set to the receiving beam M3, and the difference channel $\Delta_1$ may set to the magnitude difference between the receiving beam M4 and the receiving beam M2, as in Equation 2.

$$R_1 = \text{real}\left(\frac{\Delta_1}{\Sigma_1}\right) \quad \text{(Equation 1)}$$

$$\Sigma_1 = M_3, \Delta_1 = M_4 - M_2 \quad \text{(Equation 2)}$$

When the side lobe blocking apparatus determines the main lobe based on the monopulse ratio, it may determine an upper threshold $Th_{u1}$ and a lower threshold $Th_{d1}$ based on values of the monopulse ratio in the angular range corresponding to the main lobe of the main beam, and determine the angular range corresponding to values of the monopulse ratio between the upper threshold $Th_{u1}$ and the lower threshold $Th_{d1}$ as the main lobe, as in Equation 3.

$$H_1 = \begin{cases} 1 & \text{if } Th_{d1} < \text{real}\left\{\frac{\Delta_1}{\Sigma_1}\right\} < Th_{u1} \\ 0 & \text{else} \end{cases} \quad \text{(Equation 3)}$$

Here, 1 may represent the main lobe, and 0 may represent the side lobe.

However, the monopulse ratio $R_1$ has shape values repeated as shown in FIG. 3 depending on the reception angles of the signal. Accordingly, even if the signal (i.e., the main beam target) of the receiving beam M3 set as the main beam is received in an angular region 32, that is a side lobe other than the main lobe, there may be a possibility that the signal of the receiving beam M3 may be determined to have been received in the main lobe.

In other words, assuming that the angular range of the main lobe is a region 30 near 0 degrees, and when the upper threshold $Th_{u1}$ and the lower threshold $Th_{d1}$ are determined from the monopulse ratio $R_1$ based on the angular range of the main lobe of the main beam, and the main lobe is determined based on the upper threshold $Th_{u1}$ and the lower threshold $Th_{d1}$, only the signal of the receiving beam M3 in the region 30 near 0 degrees should be determined as the signal of the main lobe, but due to the ambiguity of the beam, even the signal of the receiving beam M3 in another angular region 32 may be determined as the signal of the main lobe. That is, even if the signal of the receiving beam M3 is received in the angular region 32, the signal of the receiving beam M3 may be determined as a signal of the main lobe.

To solve this problem, the side lobe blocking apparatus may set up a plurality of pairs of sum channels and difference channels with different characteristics by combining the plurality of receive beams, calculate a plurality of monopulse ratios using the plurality of pairs of sum channels and difference channels, and then determine whether the main beam target has been received in the main lobe using the plurality of monopulse ratios. In this way, the side lobe blocking apparatus may detect signals received in the main lobe while excluding signals received in the side lobes without beam ambiguity.

Figure 4:
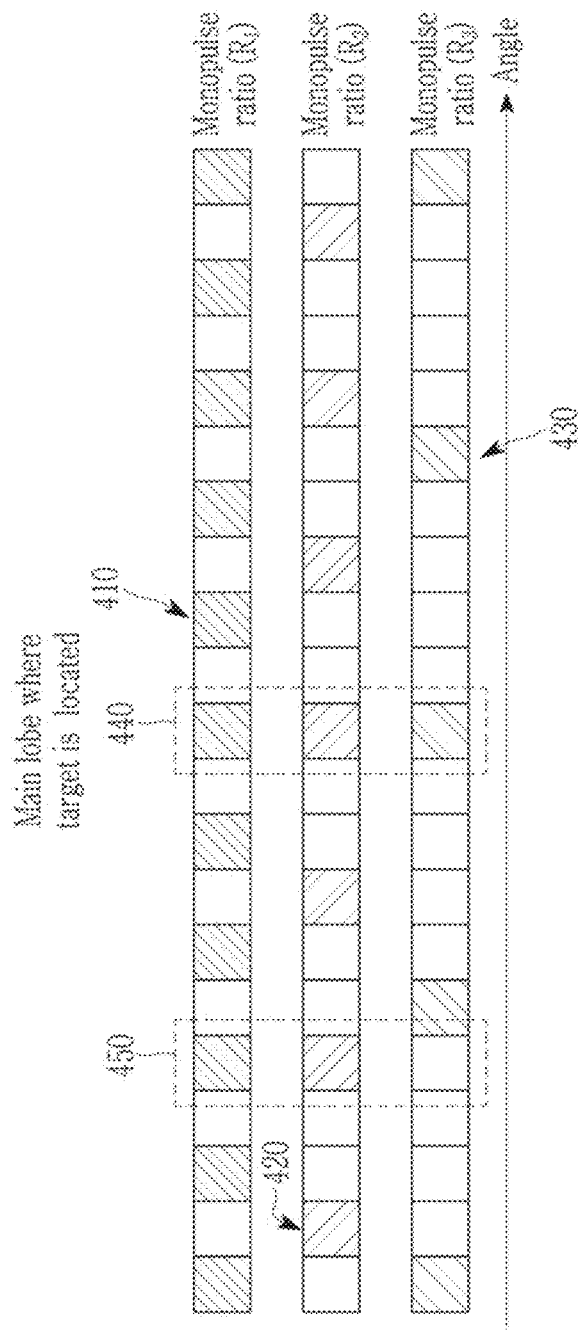
FIG. 4 is a schematic diagram illustrating a method for determining whether a main beam target has been received in a main lobe using a plurality of monopulse ratios according to one embodiment.
Figure 5:
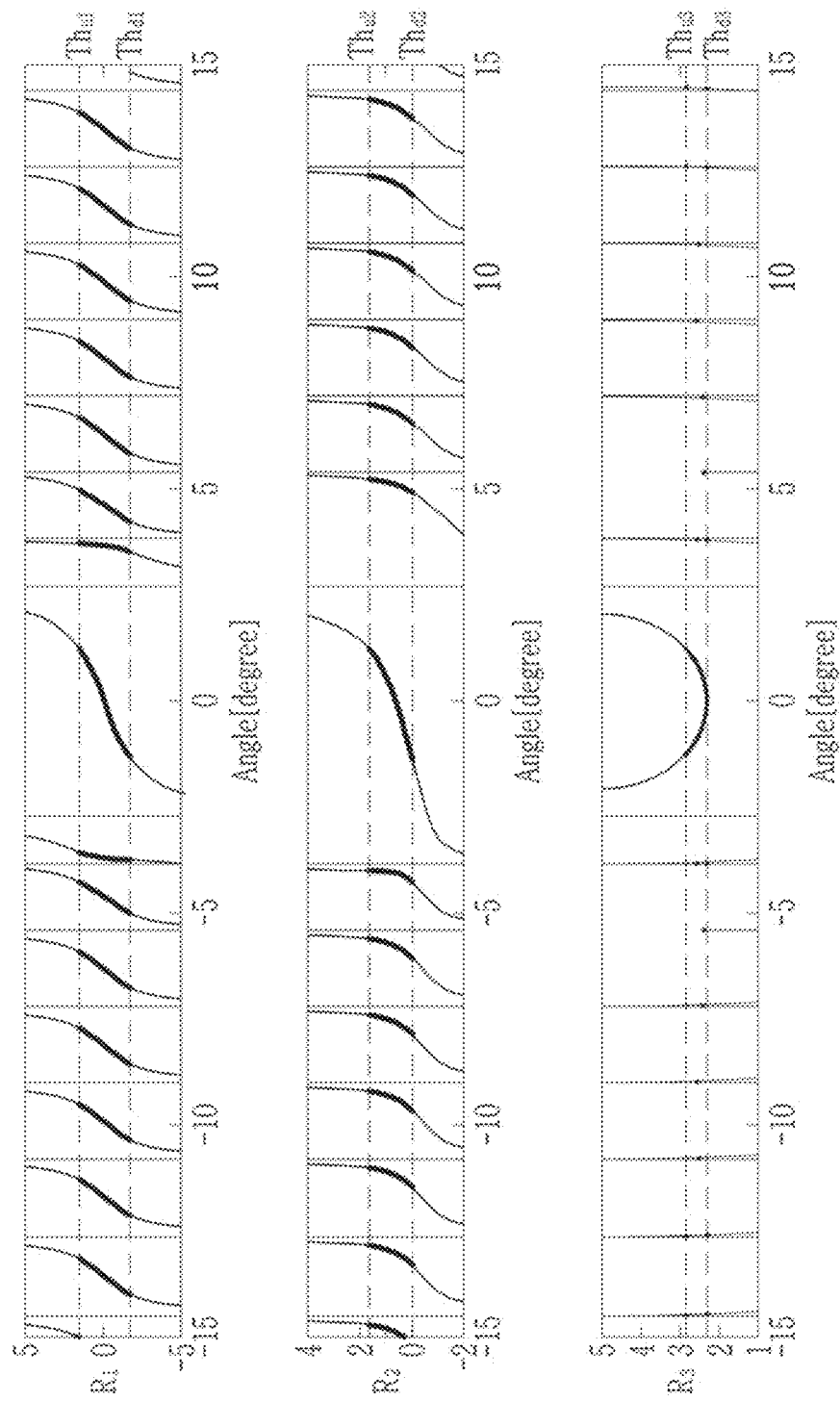
FIG. 5 is a diagram specifically illustrating a method for determining whether a main beam target has been received in a main lobe at each of a plurality of monopulse ratios according to one embodiment.

FIG. 4 is a schematic diagram illustrating a method for determining whether a main beam target has been received in a main lobe using a plurality of monopulse ratios according to one embodiment, and FIG. 5 is a diagram specifically illustrating a method for determining whether a main beam target has been received in a main lobe at each of a plurality of monopulse ratios according to one embodiment.

Referring to FIGS. 4 and 5, the side lobe blocking apparatus may calculate a plurality of monopulse ratios by combining a plurality receiving beams.

For example, as illustrated in FIG. 5, the side lobe blocking apparatus may calculate a monopulse ratio $R_1$, a monopulse ratio $R_2$, and a monopulse ratio $R_3$. In FIG. 5, three monopulse ratios $R_1$, $R_2$, and $R_3$ are shown according to the reception angles of the signal.

In some embodiments, the monopulse ratio $R_1$, the monopulse ratio $R_2$, and the monopulse ratio $R_3$ may be calculated based on Equations 4 to 6, respectively.

$$\Sigma_1 = M_3, \Delta_1 = M_4 - M_2, R_1 = \text{real}\left(\frac{\Delta_1}{\Sigma_1}\right) \quad \text{(Equation 4)}$$

$$\Sigma_2 = M_3, \Delta_2 = M_4, R_2 = \text{real}\left(\frac{\Delta_2}{\Sigma_2}\right) \quad \text{(Equation 5)}$$

$$\Sigma_3 = M_3, \Delta_3 = M_2 + M_3 + M_4, R_3 = \text{real}\left(\frac{\Delta_3}{\Sigma_3}\right) \quad \text{(Equation 6)}$$

At the monopulse ratio $R_1$, the sum channel $\Sigma_1$ may be set to the receiving beam $M_3$, and the difference channel $\Delta_1$ may be set to the difference between the receiving beam $M_4$ and the receiving beam $M_2$.

At the monopulse ratio $R_2$, the sum channel $\Sigma_2$ may be set to the receiving beam $M_3$ and the difference channel $\Delta_2$ may be set to the receiving beam $M_4$.

At the monopulse ratio $R_3$, the sum channel $\Sigma_3$ may be set to the receive beam $M_3$, and the difference channel $\Delta_3$ may be set to the sum of the receive beam $M_2$, the receive beam $M_3$, and the receive beam $M_4$.

Referring to FIG. 4, the side lobe blocking apparatus may determine a main lobe 410 of the received signal based on the monopulse ratio $R_1$.

The side lobe blocking apparatus may determine a main lobe 420 of the received signal based on the monopulse ratio $R_2$.

The side lobe blocking apparatus may determine a main lobe 430 of the received signal based on the monopulse ratio $R_3$.

However, referring to the main lobes 410, 420, and 430 determined from each of the monopulse ratio $R_1$, monopulse ratio $R_2$, and monopulse ratio $R_3$, as shown in FIG. 4, signals received in an angle other than the actual main lobe may also be detected as signals received in the main lobe depending on the angle of the received signals. That is, even if signals are received at an angle other than the actual main lobe, the signals may be detected as being received in the main lobe.

The side lobe blocking apparatus according to the embodiment may determine a main lobe 440, which is commonly determined in all of the monopulse ratio $R_1$, the monopulse ratio $R_2$, and the monopulse ratio $R_3$ as the main lobe where the target is located, so that the side lobe blocking apparatus may determine signals received at angles other than the actual main lobe as side lobe signals and remove the signals.

For example, assume that a real signal, that is, a signal of the receiving beam M3 (i.e., the main beam target), is received in an angular range 450. The side lobe blocking apparatus may determine that the signal of the receiving beam $M_3$ is received in the main lobe based on the monopulse ratio $R_1$. The side lobe blocking apparatus may determine that the signal of the receiving beam $M_3$ is received in the main lobe based on the monopulse ratio $R_2$. The side lobe blocking apparatus may determine that the signal of the receiving beam $M_3$ is received in the side lobe rather than the main lobe based on the monopulse ratio $R_3$. In this case, the side lobe blocking apparatus may finally determine that the signal of the receiving beam $M_3$ was received in the side lobe rather than the main lobe.

More specifically, as shown in FIG. 5, it is assumed that three monopulse ratios $R_1$, $R_2$, and $R_3$ are generated by combining a plurality of receiving beams.

The side lobe blocking apparatus may set an upper threshold $Th_{u1}$ and a lower threshold $Th_{d1}$ based on values of the monopulse ratio $R_1$ in the angular range corresponding to the main lobe of the main beam in the monopulse ratio $R_1$, and determine an angular range corresponding to the values of the monopulse ratio $R_1$ between the upper threshold $Th_{u1}$ and the lower threshold That as the main lobe, as in Equation 3.

The side lobe blocking apparatus may set an upper threshold $Th_{u2}$ and a lower threshold $Th_{d2}$ based on values of the monopulse ratio $R_2$ in the angular range corresponding to the main lobe of the main beam in the monopulse ratio $R_2$, and determine an angular range corresponding to the values of the monopulse ratio $R_2$ between the upper threshold $Th_{u2}$ and the lower threshold $Th_{d2}$ as the main lobe, as in Equation 3.

The side lobe blocking apparatus may set an upper threshold Thus and a lower threshold $Th_{d3}$ based on values of the monopulse ratio $R_3$ in the angular range corresponding to the main lobe of the main beam in the monopulse ratio $R_3$, and determine an angular range corresponding to the values of the monopulse ratio $R_3$ between the upper threshold Thus and the lower threshold $Th_{d3}$ as the main lobe, as in Equation 3.

In FIG. 5, for convenience, the angular range from −15 degrees to 15 degrees is shown, and the values of the monopulse ratios determined as the main lobe are indicated in bold.

Figure 6:
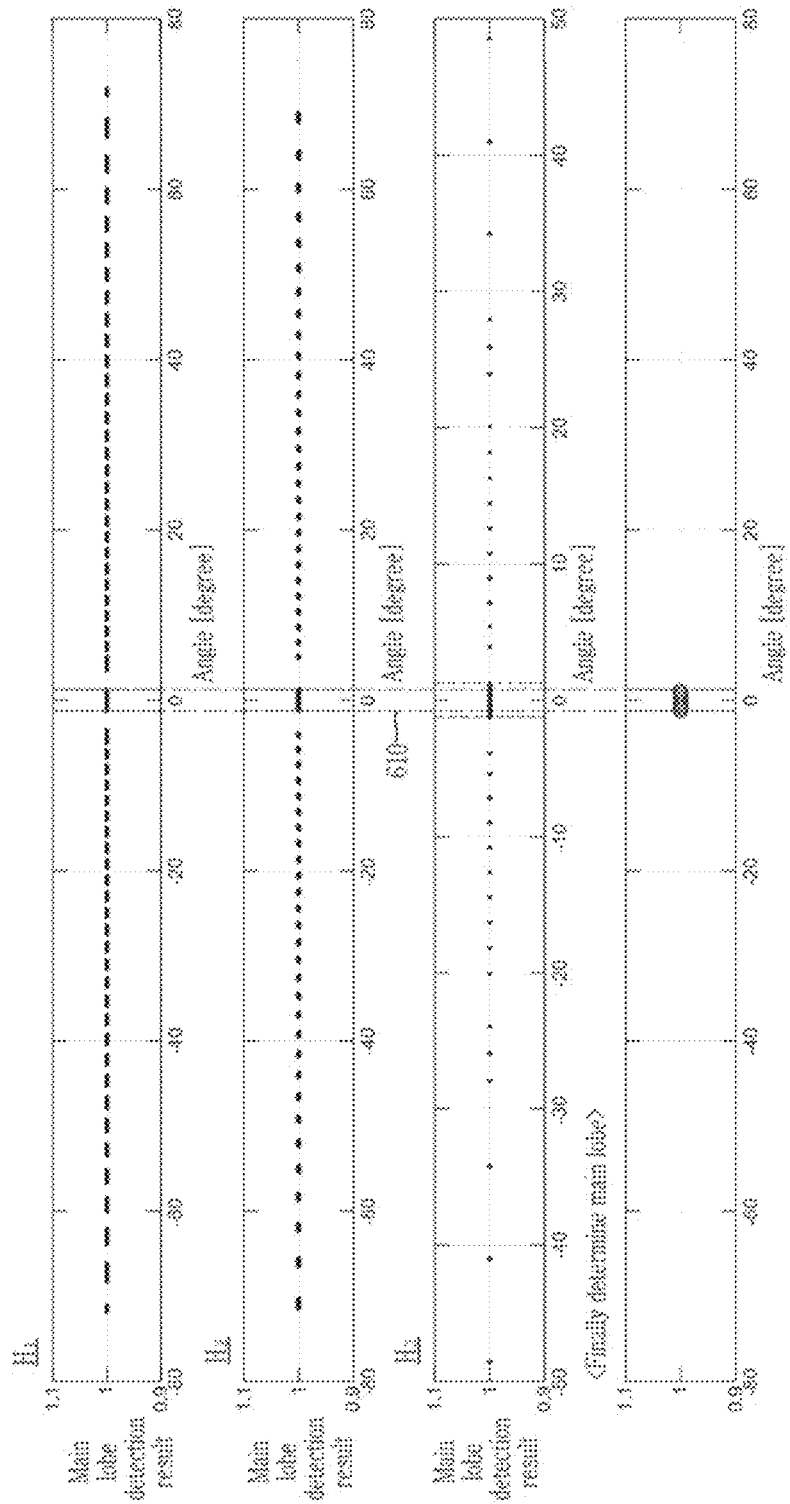
FIG. 6 is a diagram illustrating a method for determining whether a main beam target is finally received in a main lobe from a main lobe result determined based on each of a plurality of monopulse ratios according to one embodiment.

FIG. 6 is a diagram illustrating a method for determining whether a main beam target is finally received in a main lobe from a main lobe result determined based on each of a plurality of monopulse ratios according to one embodiment.

It is assumed that the main lobe determined based on each of the three monopulse ratios $R_1$, $R_2$, and $R_3$ appears as shown in FIG. 6. In FIG. 6, the main lobe detection results $H_1$, $H_2$, and $H_3$ in the angular range determined to be the main lobe at each of the three monopulse ratios $R_1$, $R_2$, and $R_3$ are indicated as 1.

The side lobe blocking apparatus may determine the main lobe 610 where the target is located if the main lobe 610 is commonly determined from the three monopulse ratios $R_1$, $R_2$, and $R_3$ based on the main lobe detection results $H_1$, $H_2$, and $H_3$ determined from each of the three monopulse ratios $R_1$, $R_2$, and $R_3$. That is, if the main beam target is determined to be the main lobe 610 in all three monopulse ratios $R_1$, $R_2$, and $R_3$, it may be finally determined that the main beam target was received in the main lobe 610.

Figure 7:
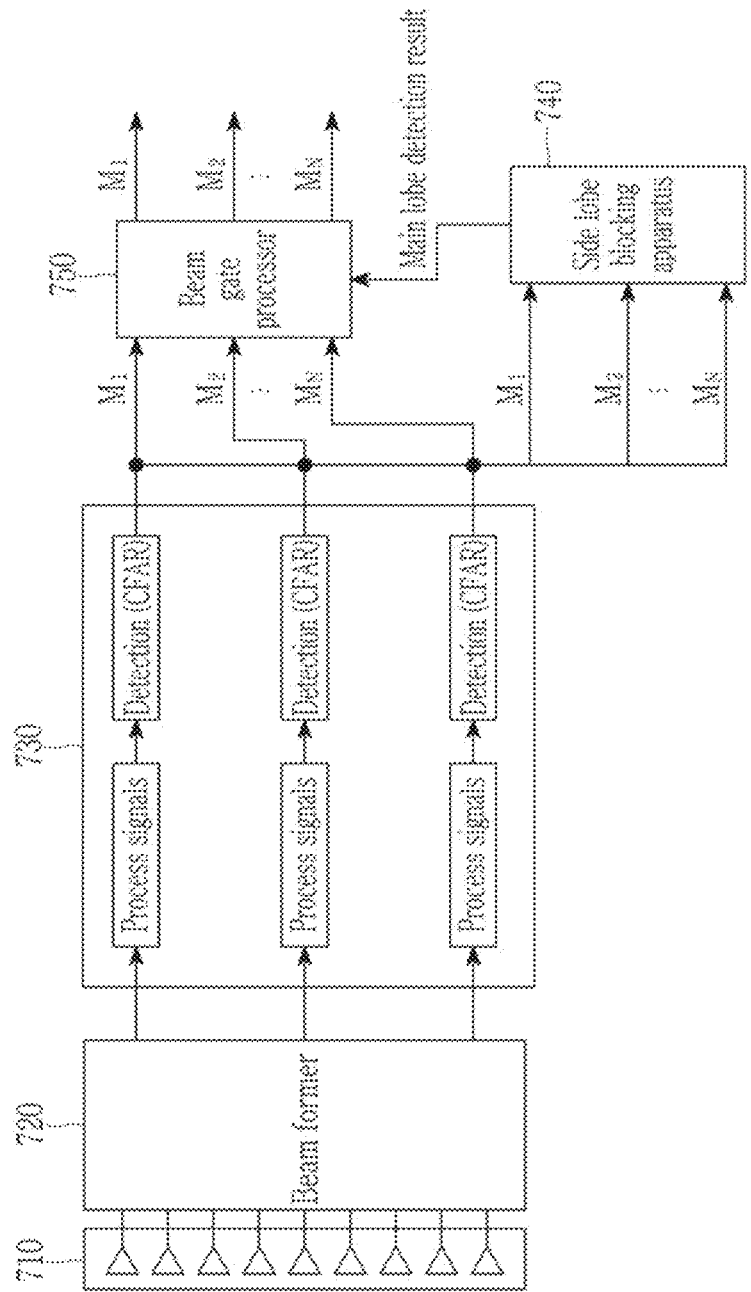
FIG. 7 is a diagram showing a receiving device of a radar including a side lobe blocking apparatus according to one embodiment.

FIG. 7 is a diagram showing a receiving device of a radar including a side lobe blocking apparatus according to one embodiment.

Referring to FIG. 7, the radar receiving apparatus may include an array antenna 710, a beam former 720, a signal processor 730, a side lobe blocking apparatus 740, and a beam gate processor 750.

The array antenna 710 may receive radar signals reflected by a target. In some embodiments, the array antenna 710 may be a linear array antenna. For example, the array antenna 710 may include 64 antenna elements and may be a linear array antenna with antenna element spacing of half a wavelength.

The beam former 720 may form a plurality of receiving beams $M_1$ to $M_N$ using antenna elements of the array antenna 710. The spacing between adjacent receiving beams may be set to $\theta_s$ as shown in FIG. 2. In some embodiments, $\theta_s$ may be set to 0.45 times the beam width.

The signal processor 730 may process signals and detect the presence of the target for each receiving beam $M_1$ to $M_N$. The signal processor 730 may detect the presence of the target through a constant false alarm rate (CFAR). The signal processor 730 may transmit the receiving beams $M_1$ to $M_N$ and the target detection results for the receiving beam $M_1$ to $M_N$ to the side lobe blocking apparatus 740 and the beam gate processor 750.

In some embodiments, the signal processor 730 may calculate a signal-to-noise ratio (SNR) for the detected target signal of each receiving beam $M_1$ to $M_N$.

As described above, the side lobe blocking apparatus 740 may calculate multiple monopulse ratios using the plurality of receiving beams $M_1$ to $M_N$, determine whether the main beam target is a signal received in the main lobe using the plurality of monopulse ratios, and transmit the main lobe detection result for the main beam target to the beam gate processor 750.

The beam gate processor 750 may select and output only a target signal determined to be the main lobe among the target signals detected by the signal processor 730 based on the target detection results of the signal processor 730 and the main lobe detection result of the side lobe blocking apparatus 740, among the plurality of receiving beams $M_1$ to $M_N$. That is, the beam gate processor 750 may output the receiving beam target corresponding to the main lobe, excluding the receiving beam targets corresponding to the side lobes, based on the target detection result of the signal processor 730 and the main lobe detection result of the side lobe blocking apparatus 740.

Figure 8:
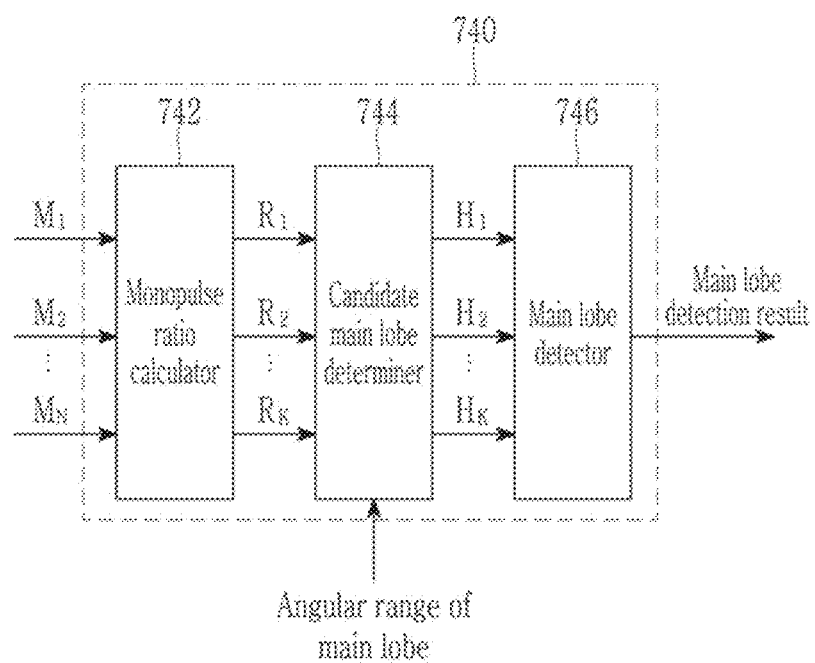
FIG. 8 is a diagram showing the side lobe blocking apparatus illustrated in FIG. 7.
Figure 9:
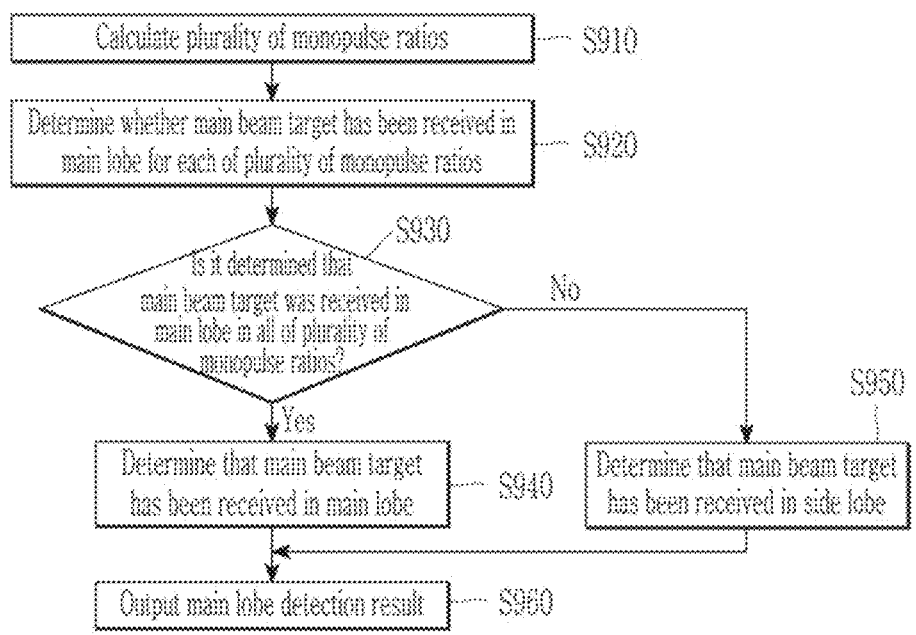
FIG. 9 is a flow chart showing a side lobe blocking method of the side lobe blocking apparatus illustrated in FIG. 7.

FIG. 8 is a diagram showing the side lobe blocking apparatus illustrated in FIG. 7, and FIG. 9 is a flow chart showing a side lobe blocking method of the side lobe blocking apparatus illustrated in FIG. 7.

Referring to FIG. 8, the side lobe blocking apparatus 740 may include a monopulse ratio calculator 742, a candidate main lobe determiner 744, and a main lobe detector 746.

Referring to FIG. 9 together with FIG. 8, the monopulse ratio calculator 742 may calculate a plurality of monopulse ratios corresponding to the number of monopulse ratios to be used (S910).

In some embodiments, the monopulse ratio calculator 742 may determine the number of monopulse ratios to use based on information about the number of monopulse ratios received from an outside. In some embodiments, the monopulse ratio calculator 742 may determine the number of monopulse ratios based on the SNR for the target signal of the receiving beam, that is, the main beam, in which the target exists.

When the number of monopulse ratios is determined, the monopulse ratio calculator 742 may calculate the determined number of monopulse ratios using multiple receiving beams.

The monopulse ratio calculator 742 may set pairs of sum channels and difference channels corresponding to a determined number using multiple receiving beams, and calculate the determined number of monopulse ratios from the ratio of the sum channel and difference channel of each pair.

According to an embodiment, the monopulse ratio calculator 742 may set the main beam to the sum channel based on the target detection results of the signal processor 730. The monopulse ratio calculator 742 may set difference channels using at least one of the plurality of receiving beams.

In some embodiments, three pairs of sum channels and difference channels may be set as in Equations 4 to 6, and accordingly, three monopulse ratios $R_1$, $R_2$, and $R_3$ may be calculated.

In some embodiments, five pairs of sum channels and difference channels may be set as in Equations 4 to 6, 7 and 8, and accordingly, five monopulse ratios $R_1$, $R_2$, $R_3$, $R_4$ and $R_3$ may be calculated.

$$\sum\nolimits_4 = M_3,\, \Delta_4 = M_2,\, R_4 = \mathrm{real}\left(\frac{\Delta_4}{\sum_4}\right) \quad \text{(Equation 7)}$$

$$\sum\nolimits_5 = M_3,\, \Delta_5 = M_2 + M_4,\, R_5 = \mathrm{real}\left(\frac{\Delta_5}{\sum_5}\right) \quad \text{(Equation 8)}$$

The candidate main lobe determiner 744 may determine whether the main beam target has been received in the main lobe for each of a plurality of monopulse ratios (S920). The candidate main lobe determiner 744 may determine whether the main beam target has been received in the main lobe for each of the plurality of monopulse ratios based on Equation 9.

$$H_k = \begin{cases} 1 & \text{if } Th_{dk} < \mathrm{real}\left\{\dfrac{\Delta_k}{\sum_k}\right\} < Th_{uk} \\ 0 & \text{else} \end{cases} \quad \text{(Equation 9)}$$

Here, $H_k$ may indicate whether the main beam target has been received in the main lobe from the k-th monopulse ratio, and $H_k=1$ may indicate that the main beam target is determined to have been received in the main lobe from the k-th monopulse ratio. $H_k=0$ may indicate that the main beam target is determined to be received in the side lobes rather than the main lobe from the k-th monopulse ratio. $TH_{uk}$ and $TH_{dk}$ may represent the upper and lower thresholds of the k-th monopulse ratio among the plurality of monopulse ratios.

In some embodiments, the candidate main lobe determiner 744 may determine an upper threshold and a lower threshold of each monopulse ratio based on the angular range of the main lobe of the main beam input from the outside and each monopulse ratio.

In some embodiments, the candidate main lobe determiner 744 may determine the upper and lower thresholds of each monopulse ratio based on the angular range of main lobe of the main beam input from outside, each monopulse ratio, and the SNR of the main beam target For example, when the SNR is equal to or greater than a reference value, the upper and lower thresholds for each monopulse ratio may be determined based on the angular range of the main lobe and each monopulse ratio. Meanwhile, when the SNR is lower than the reference value, the upper and lower thresholds of each monopulse ratio may be determined as values obtained by adding a certain margin to the values determined based on the angular range of the main lobe and each monopulse ratio.

If the main beam target is determined to have been received in the main lobe in all of the plurality of monopulse ratios (S930), the main lobe detector 746 may finally detect (determine) that the main beam target has been received in the main lobe (S940). The main lobe detection of the main lobe detector 746 may be determined as in Equation 10.

$$\text{Main Target} = \begin{cases} 1 & \text{if } D = \dfrac{1}{K}\sum_{k=1}^{K} H_k = 1 \\ 0 & \text{else} \end{cases} \quad \text{(Equation 10)}$$

Here, MainTarget indicates whether the main beam target has been received in the main lobe, and MainTarget=1 may indicate that the main beam target has been received in the main lobe.

If the main beam detector 746 may determine that the main beam target has been received in the side lobe in at least one of the plurality of monopulse ratios (S930), it may finally determine that the main beam target has been received in the side lobe (S950).

The main lobe detector 746 may output the main lobe detection result of the main beam target to the beam gate processor 750 (S960).

In an actual radar system, the detection probability of the main lobe using each monopulse ratio may not be 1 due to environmental factors such as noise, and accordingly, the probability of removing the signals from the side lobes may also not be 1. In particular, when the SNR of the main beam target is low, it may be difficult to determine whether the main beam target has been received in the main lobe based on Equation 10.

To overcome this, when determining the upper and lower thresholds for each monopulse ratio, a margin may be additionally set based on the SNR of the main beam target.

The side lobe blocking apparatus 740 may set the upper and lower thresholds of each monopulse ratio as values obtained by adding a certain margin to the values determined based on the angular range of the main lobe and each monopulse ratio when the SNR of the main beam target is lower than the reference value, to prevent the main lobe signal from being removed. In this case, the area determined to be the main lobe from the monopulse ratio may expand. Therefore, the side lobe blocking apparatus 740 may reduce the probability of detecting the side lobe signals by using additional monopulse ratios. In other words, the side lobe blocking apparatus 740 may set the upper and lower thresholds of the monopulse ratio to values with sufficient margin to ensure detection of the main lobe as much as possible when the SNR of the main beam target is lower than the reference value, and may additionally increase the number of monopulse ratios to be used.

On the other hand, the side lobe blocking apparatus 740 may use the most efficient minimum number of monopulse ratios by tightly setting the upper and lower thresholds of each monopulse ratio based on the angular range of the main lobe of the main beam main lobe and each monopulse ratio, when the SNR of the main beam target is equal to or greater than the reference value.

In some embodiments, if the SNR of the main beam target is less than the reference value, the upper and lower thresholds of the monopulse ratio may be set to values with sufficient margin to ensure detection of the main lobe as much as possible, and the threshold value th for detection of the main lobe may be set or adjusted as in Equation 11.

$$\text{Main Target} = \begin{cases} 1 & \text{if } D = \frac{1}{K}\sum_{k=1}^{K} H_k \geq th \\ 0 & \text{else} \end{cases} \quad \text{(Equation 11)}$$

For example, when the number of monopulse ratios is K, if the SNR of the main beam target is lower than the reference value, the threshold value th may be set to a value less than K, and if the SNR of the main beam target is equal to or greater than the reference value, the threshold value th may be set to a value closer to 1.

The side lobe suppressor may determine the number of monopulse ratios to use based on the SNR of the main beam target, or may adjust the threshold value (th) shown in Equation 11.

Figure 10:
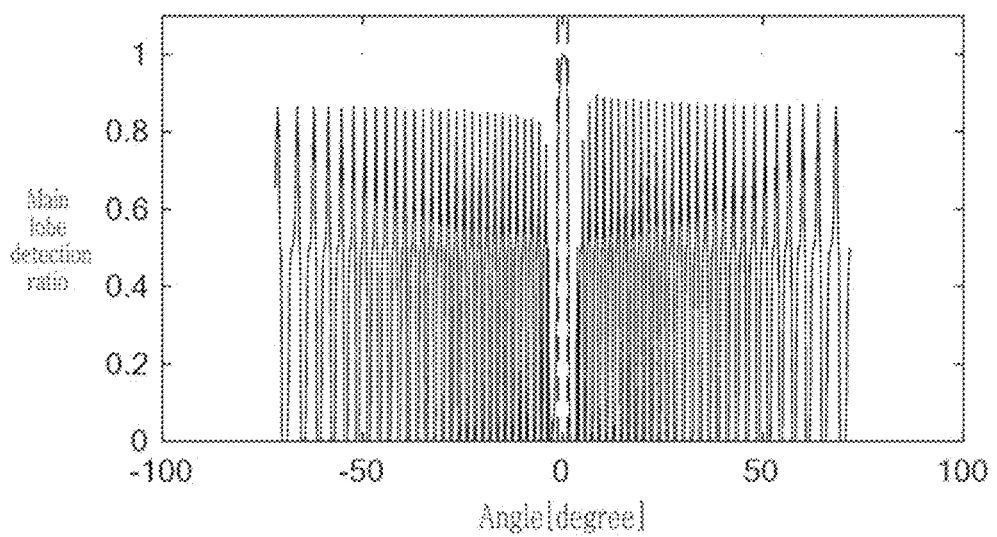
FIGS. 10 to 12 are graphs simulating the main lobe detection ratio at each angle according to the number of monopulse ratios, respectively.
Figure 11:
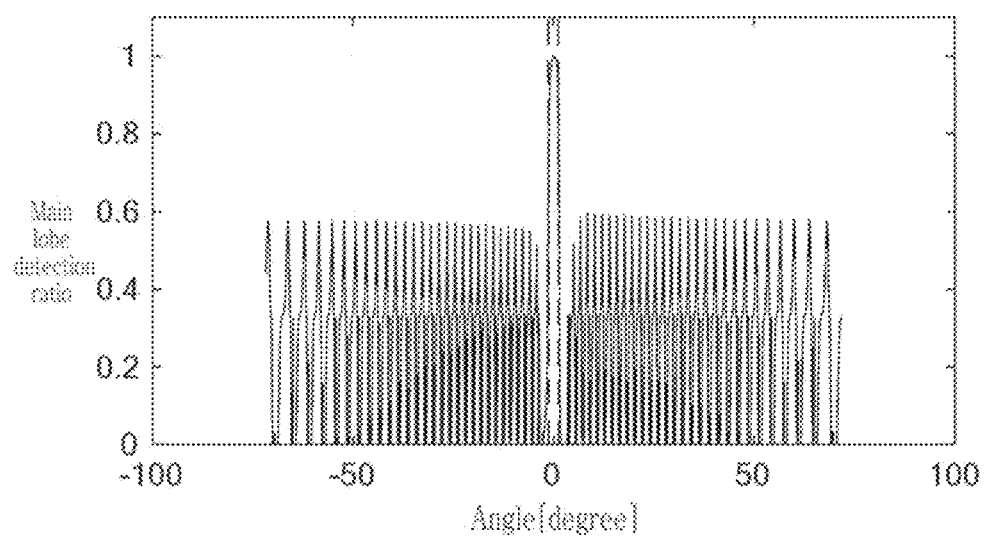
Figure 12:
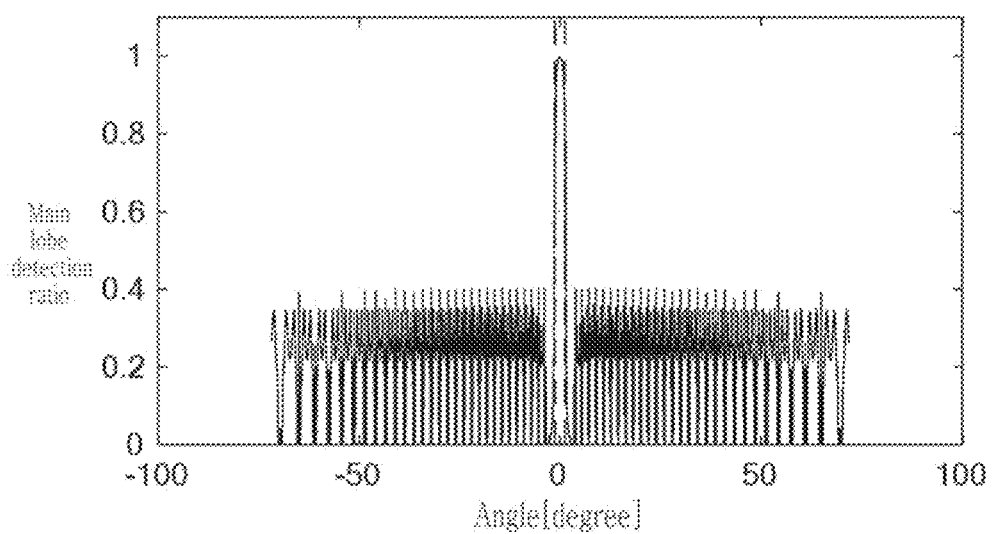

FIGS. 10 to 12 are graphs simulating the main lobe detection ratio at each angle according to the number of monopulse ratios, respectively. The main lobe detection rate may correspond to D in Equation 11.

FIGS. 10 to 12 show the ratio of the number of main lobe detections (main lobe detection ratio) according to the reception angle of the main beam target, obtained from the results of 10,000 Monte Carlo simulations performed by applying the side lobe blocking method according to the embodiment in a noisy environment (SNR of the main beam target=9 dB). At this time, FIG. 10 shows the ratio of the number of main lobe detections according to the reception angles of the main beam target when the number K of monopulse ratios is 2, FIG. 11 shows the ratio of the number of main lobe detections according to the reception angles of the main beam target when the number K of monopulse ratios is 3, and FIG. 12 shows the ratio of the number of main lobe detections according to the reception angles of the main beam target when the number K of monopulse ratios is 5. In FIGS. 10 to 12, the main beam may be set to $M_3$. When the number K of monopulse ratios is 2, the monopulse ratios $R_1$ and $R_2$ were calculated based on Equations 4 and 5. When the number K of monopulse ratios is 3, the monopulse ratios $R_1$, $R_2$, and $R_3$ were calculated based on Equations 4, 5, and 6. When the number K of monopulse ratios is 5, the monopulse ratios $R_1$, $R_2$, $R_3$, $R_4$, and $R_5$ were calculated based on Equations 4, 5, 6, 7, and 8.

In FIGS. 10 to 12, the area between two vertical dotted lines near 0 degrees represents the angular region of the main lobe, and in the angular area of the main lobe, the closer the ratio of the number of main lobe detections is to 1, and in the angular regions other than the angular region of the main lobe, the lower the ratio of the number of main lobe detections, it may be determined that the performance of the side lobe blocking apparatus is good.

Referring to FIGS. 10 to 12, it can be seen that as the number K of monopulse ratios increases, the difference in main lobe detection ratio between the angular region of the main lobe and the angular region of the side lobe increases. That is, it can be seen that the greater the number K of monopulse ratios, the better the main lobe detection performance of the side lobe blocking apparatus 740. Based on this result, the threshold th or the number of monopulse ratios to be used may be set.

Figure 13:
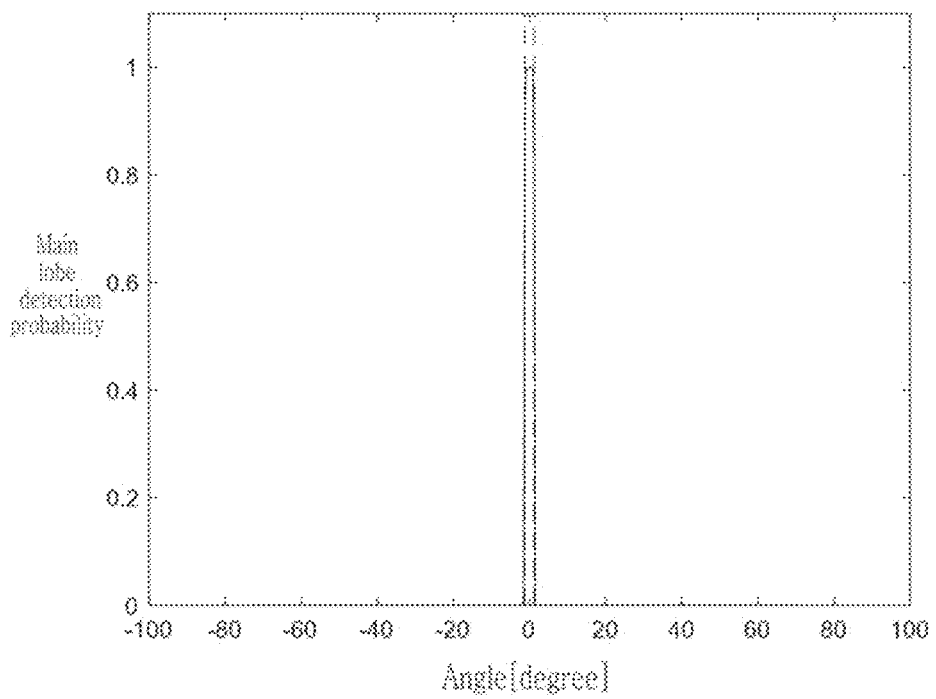
FIG. 13 is a graph simulating the main lobe detection performance of a side lobe blocking apparatus according to an embodiment.

FIG. 13 is a graph simulating the main lobe detection performance of a side lobe blocking apparatus according to an embodiment.

In FIG. 13, the main lobe detection probability according to the reception angle of the main beam target is shown from the results of 1000 Monte Carlo simulations performed by applying the side lobe blocking method according to the embodiment when the SNR of the main beam target is 13 dB, the number K of monopulse ratios is 3, and the threshold value th is 0.7. At this time, the three monopulse ratios $R_1$, $R_2$, and $R_3$ were calculated based on Equations 4, 5, and 6. In the angular region of the main lobe, the closer the main lobe detection probability is to 1, and in the angular region of the side lobe, the closer the main lobe detection probability is to 0, it may mean that the performance of blocking side lobes is good.

As can be seen from FIG. 13, when the side lobe blocking method according to the embodiment is used, the main lobe detection probability is nearly 1 in the angular region of the main lobe and nearly 0 in the angular regions of the side lobes. That is, it can be seen that the signals of the side lobe is blocked in the entire angular area of the side lobe.

Figure 14:
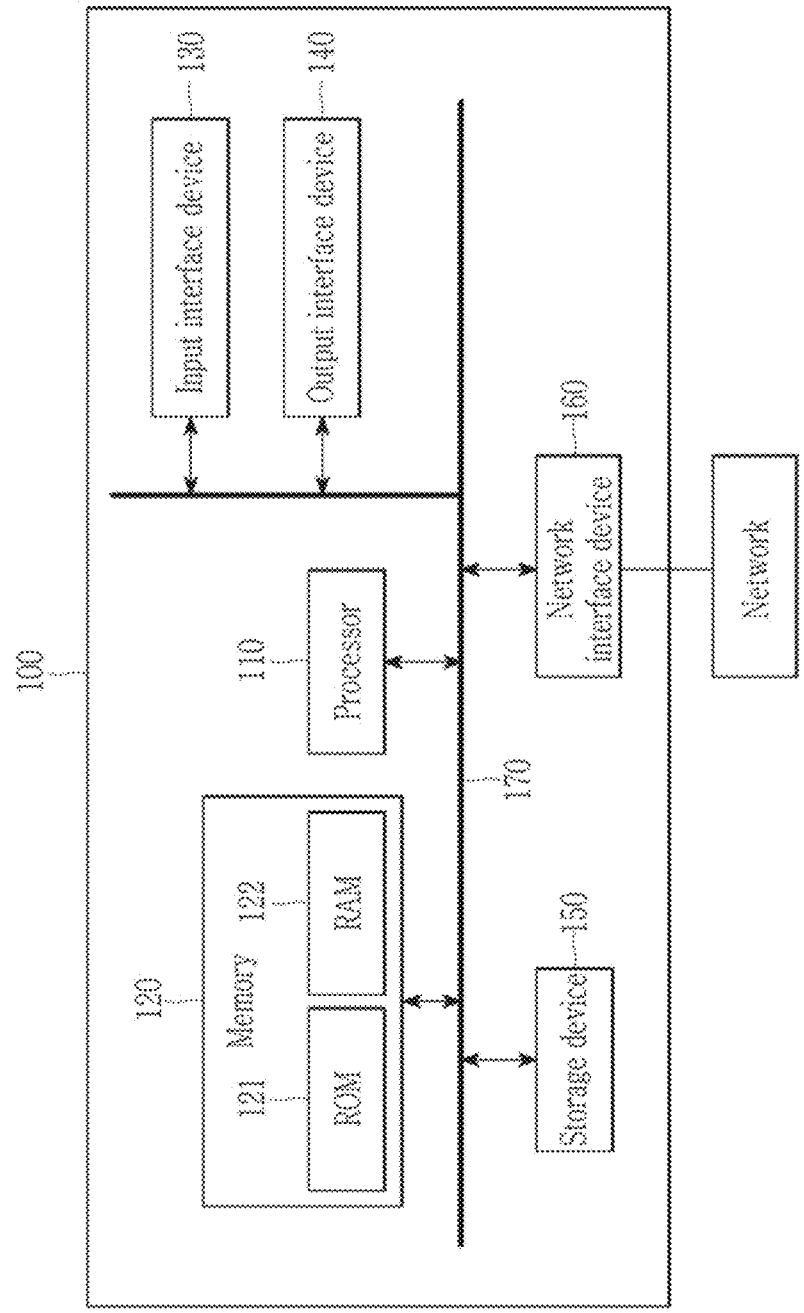
FIG. 14 is a drawing showing a side lobe blocking apparatus according to another embodiment.

FIG. 14 is a drawing showing a side lobe blocking apparatus according to another embodiment.

Referring to FIG. 14, the side lobe blocking apparatus 100 may represent a computing device in which the side lobe blocking method described above is implemented.

The side lobe blocking apparatus 100 may include at least one of a processor 110, a memory 120, an input interface device 130, an output interface device 140, a storage device 150, and a network interface device 160. Each of the components may be connected by a common bus 170 to communicate with each other. In addition, each of the components may be connected through an individual interface or a separate bus centering on the processor 110 instead of the common bus 170.

The processor 110 may be implemented as various types such as an application processor (AP), a central processing unit (CPU), a graphics processing unit (GPU), etc., and may be any semiconductor device that executes a command stored in the memory 120 or the storage device 150. The processor 110 may execute a program commands stored in at least one of the memory 120 and the storage device 150. The processor 210 may store program commands for implementing at least some functions and/or operations of the monopulse ratio calculator 742, the candidate main lobe determiner 744, and main lobe detector 746 described with reference to FIG. 8 in the memory 120, and executes program commands to perform the functions and/or operations described based on FIG. 1.

The memory 120 and storage device 150 may include various forms of volatile or non-volatile storage media. For example, the memory 120 may include a read-only memory (ROM) 121 and a random access memory (RAM) 122. The memory 120 may be located inside or outside the processor 110, and the memory 120 may be connected to the processor 110 through various means already known.

The input interface device 130 may be configured to provide data to the processor 110.

The output interface device 140 may be configured to output data from the processor 110.

The network interface device 160 may transmit or receive signals to or from an external device via a wired network or a wireless network.

According to at least one embodiment, the detection performance of a target in the main lobe may be improved and signals in the angular ranges of side lobes may be efficiently blocked.

At least some of the side lobe blocking method according to embodiments of the present disclosure may be implemented as a program or software running on a computing device, and the program or software may be stored on a computer-readable medium.

In addition, at least some of the side lobe blocking method according to embodiments of the present disclosure may be implemented as hardware that can be electrically connected to a computing device.

Although the embodiments of the present disclosure have been described in detail above, the scope of the present disclosure is not limited thereto, and various modifications and improvements of those skilled in the art using the basic concepts of the present disclosure defined in the following claims are also included in the present disclosure.

What is claimed is:

1. A side lobe blocking method for blocking side lobe signals in a side lobe blocking apparatus, the side lobe blocking method comprising:
    setting a sum channel and a plurality of different difference channels using a plurality of receiving beams and a main beam in which a target exists among the plurality of receiving beams;
    calculating a plurality of different monopulse ratios using ratios between each of the plurality of different difference channels and the sum channel;
    determining whether a main beam target is received in a main lobe based on each of the plurality of different monopulse ratios; and
    finally detecting whether the main beam target is received in the main lobe based on results determined based on each of the plurality of different monopulse ratios.

2. The side lobe blocking method of claim 1, wherein the finally detecting includes finally determining that the main beam target is received in the main lobe when it is determined that the main beam target is received in the main lobe based on monopulse ratios greater than or equal to a threshold number among the plurality of different monopulse ratios.

3. The side lobe blocking method of claim 2, wherein the finally determining includes setting the threshold number based on the signal-to-noise ratio of the main beam target.

4. The side lobe blocking method of claim 1, wherein the setting a sum channel and a plurality of different difference channels includes:
    setting the main beam as the sum channel; and
    setting each of the plurality of different difference channels using at least one beam among the plurality of receiving beams.

5. The side lobe blocking method of claim 1, wherein the determining includes:
    determining an upper threshold and a lower threshold of each of the plurality of different monopulse ratios; and
    determining whether the main beam target is received in the main lobe from each of the plurality of different monopulse ratios based on the upper threshold and the lower threshold of each of the plurality of different monopulse ratios.

6. The side lobe blocking method of claim 5, wherein the determining the upper and lower thresholds includes setting the upper and lower threshold based on an angular range of the main lobe of the main beam for each of the plurality of different monopulse ratios.

7. The side lobe blocking method of claim 6, wherein the determining the upper and lower thresholds further includes additionally applying a margin to the upper and lower thresholds based on a signal-to-noise ratio of the main beam target.

8. The side lobe blocking method of claim 1, wherein the calculating a plurality of different monopulse ratios includes determining the number of monopulse ratios based on a signal-to-noise ratio of the main beam target.

9. A side lobe blocking apparatus of a radar comprising:
    a monopulse ratio calculator configured to set a sum channel and a plurality of different difference channels using a plurality of receiving beams and a main beam in which a target exists among the plurality of receiving beams, and calculate a plurality of different monopulse ratios using ratios between each of the plurality of different difference channels and the sum channel;
    a candidate main lobe determiner configured to determine whether a main beam target is received in a main lobe based on each of the plurality of different monopulse ratios; and
    a main lobe detector configured to finally detect whether the main beam target is received in the main lobe based on results determined based on each of the plurality of different monopulse ratios.

10. The side lobe blocking apparatus of claim 9, wherein the main lobe detector is configured to finally detect that the main beam target is received in the main lobe when it is determined that the main beam target is received in the main lobe based on monopulse ratios greater than or equal to a threshold number among the plurality of different monopulse ratios.

11. The side lobe blocking apparatus of claim 10, wherein the main lobe detector is configured to set the threshold number based on a signal-to-noise ratio of the main beam target.

12. The side lobe blocking apparatus of claim 9, wherein the monopulse ratio calculator is configured to set the main beam as the sum channel and is configured to set each of the plurality of different difference channels using at least one beam among the plurality of receiving beams.

13. The side lobe blocking apparatus of claim 12, wherein the monopulse ratio calculator is configured to:
- select one receiving beam from the remaining receiving beams excluding the main beam among the plurality of receiving beams;
- set one of the plurality of different difference channels using the selected one receiving beam; and
- set at least one of the plurality of different difference channels using the sum or difference of at least two receiving beams among the plurality of receiving beams.

14. The side lobe blocking apparatus of claim 12, wherein the monopulse ratio calculator is configured to determine the number of monopulse ratios based on a signal-to-noise ratio of the main beam target.

15. The side lobe blocking apparatus of claim 9, wherein the candidate main lobe determiner is configured to determine an upper threshold and a lower threshold of each of the plurality of different monopulse ratios, and is configured to determine whether the main beam target is received in the main lobe from each of the plurality of different monopulse ratios based on the upper threshold and the lower threshold of each of the plurality of different monopulse ratios.

16. The side lobe blocking apparatus of claim 15, wherein the candidate main lobe determiner is configured to set the upper and lower thresholds includes setting the upper and lower threshold based on an angular range of the main lobe of the main beam for each of the plurality of different monopulse ratio.

17. The side lobe blocking apparatus of claim 16, wherein the candidate main lobe determiner is configured to additionally apply a margin to the upper and lower thresholds based on a signal-to-noise ratio of the main beam target.

* * * * *